United States Patent
Maffeis

(10) Patent No.: US 8,985,656 B2
(45) Date of Patent: Mar. 24, 2015

(54) CLAMP HAVING THREE JAWS

(71) Applicant: GIMATIC S.p.A., Roncadelle (BS) (IT)

(72) Inventor: Giuseppe Maffeis, Roncadelle (IT)

(73) Assignee: GIMATIC S.p.A., Roncadelle (BS) (IT)

(*) Notice: Subject to any disclaimer, the term of this patent is extended or adjusted under 35 U.S.C. 154(b) by 0 days.

(21) Appl. No.: 13/906,524

(22) Filed: May 31, 2013

(65) Prior Publication Data

US 2013/0334831 A1 Dec. 19, 2013

(30) Foreign Application Priority Data

Jun. 19, 2012 (IT) ............................ BS2012A00095

(51) Int. Cl.
 *B25J 15/10* (2006.01)
 *B25J 15/00* (2006.01)
 *B25J 15/02* (2006.01)

(52) U.S. Cl.
 CPC ............ *B25J 15/0028* (2013.01); *B25J 15/103* (2013.01); *B25J 15/0047* (2013.01); *B25J 15/02* (2013.01); *B25J 15/10* (2013.01)
 USPC ....................................... 294/119.1; 294/207

(58) Field of Classification Search
 CPC .. B25J 15/026; B25J 15/0266; B25J 15/0273; B25J 15/0293; B25J 15/086; B25J 15/103; B25J 15/106
 USPC .............. 294/93, 94, 195, 207, 119.1; 901/38
 See application file for complete search history.

(56) References Cited

U.S. PATENT DOCUMENTS

| 4,279,438 | A | * | 7/1981 | Singh ............................. 294/195 |
| 4,479,673 | A | * | 10/1984 | Inaba et al. .................... 294/207 |
| 4,858,979 | A | * | 8/1989 | Parma ............................ 294/106 |
| 6,193,292 | B1 | | 2/2001 | Maffeis et al. |
| 6,273,485 | B1 | * | 8/2001 | Maffeis et al. ................. 294/207 |
| 6,393,694 | B2 | * | 5/2002 | Roovers .......................... 29/740 |
| 6,494,516 | B1 | * | 12/2002 | Bertini .......................... 294/207 |
| 6,505,871 | B2 | * | 1/2003 | McCormick ................ 294/119.1 |
| 8,528,953 | B2 | * | 9/2013 | Maffeis .......................... 294/207 |
| 2011/0089709 | A1 | * | 4/2011 | Neeper ....................... 294/119.1 |

FOREIGN PATENT DOCUMENTS

| DE | 3627918 | * | 2/1988 |
| EP | 0184502 A2 | | 6/1986 |
| EP | 0293153 A1 | | 11/1988 |
| FR | 2537908 | * | 6/1984 |
| GB | 2137160 | * | 10/1984 |

* cited by examiner

*Primary Examiner* — Dean Kramer
(74) *Attorney, Agent, or Firm* — Volpe and Koenig, P.C.

(57) ABSTRACT

A self-centering clamp having three jaws, for the industrial automation field is provided and is adapted to equip robotic arms. One of the jaws is controlled by a cursor directly activated by the clamp actuator, which can be electric, pneumatic, oleopneumatic, etc. The other two jaws are controlled by corresponding transfer levers kinematically coupled to the cursor. The levers rotate in a lying plane parallel to the handling plane of the jaws and the cursor.

10 Claims, 7 Drawing Sheets

CLAMP HAVING THREE JAWS

FIELD OF THE INVENTION

The present invention relates to a clamp having three jaws, in particular to a self-centering type of clamp, adapted to be used as gripping element of industrial manipulators.

STATE OF THE ART

In the field of industrial automation is known the use of robotized manipulators to which a gripping clamp for the objects to be manipulated is normally associated.

The clamps are provided with a body housing the jaws, or clamps, and the corresponding activating device. The jaws are movable between a first not-operating position or releasing position, where they don't apply any pressure on the piece to be manipulated and an operating position, or gripping position, where they apply a pressure on the piece to be manipulated adequate to provide the workpiece not becoming accidentally free during its displacement. The device for activating the jaws can be of an electric, pneumatic, oleopneumatic, etc type.

According to the number of the jaws and their movement, they can be clamps having two jaws, which can be parallel, radial or angular, clamps having three jaws, etc.

In case of three jaws these are arranged inside the clamp body, translatable in respective seats extending along radial directions intersecting each other at the longitudinal axis of the clamp (that is in turn orthogonal to such radial directions), intercepting three 120° central angles.

A kind of clamp has the gripping position corresponding to the jaws being proximal to the clamp longitudinal axis, for the external gripping of pieces that are inserted between the jaws themselves; the releasing position corresponds to the jaws being distal from the clamp longitudinal axis.

In another kind of clamp, the gripping position corresponds to the jaws being distal from the clamp longitudinal axis, for the inner gripping of pieces surrounding the jaws themselves; the releasing position corresponds to the jaws being proximal to the clamp longitudinal axis.

An example of a clamp having three translatable jaws is described in the U.S. Pat. No. 6,193,292, in the name of the Applicant.

Two technical requirements are usually needed for a clamp having three jaws for the industrial automation field.

Firstly, the three jaws have to move simultaneously to cover same travels in response to the respective activation. This requirement arises because of the need of preventing a jaw from applying a pressure before the other jaws to the piece to be manipulated, causing its undesirable and potentially dangerous misalignment with respect to the clamp longitudinal axis. Further, the three jaws coming in the gripping position at the same time makes the clamp to be self-centering.

Secondly, always more frequently is required a minimization of the clamp size and weight. A small sized clamp, and particularly vertically small sized along the longitudinal axis, is versatile in use, since it allows to manipulate even complicated shape workpieces or workpieces that are initially arranged very close to each other. The clamp lightness is important for the dynamic performances of the related manipulator, for example a robotic arm; actually, the clamp constitutes a weight applied to the end of the robotic arm, and it is evidently advantageous to reduce such a weight as much as possible.

SUMMARY OF THE INVENTION

It is an object of the present invention to provide a three jaw clamp being light and having minimum size.

In particular, it is an object of the present invention to provide a self-centering clamp of the previously mentioned type, characterized by the three jaws moving simultaneously and having identical travels, regardless of the type of the respective activating device.

Therefore, the present invention relates to a clamp having three jaws according to claim 1.

Particularly, the clamp comprises a body provided with a longitudinal axis and three coplanar seats for housing the jaws. The jaws are each alternately translatable into the respective seat in the two ways along a direction orthogonal to the longitudinal axis, between a proximal position and a distal position with respect to the longitudinal axis itself.

The distal and proximal positions correspond to the gripping and releasing positions, respectively, or vice versa, according to the requirements.

The clamp comprises as well a device for activating the jaws, that is in its turn provided with an actuator and means to drive the motion of the actuator to the jaws. The drive means comprise a cursor translatable in the clamp body, integrally with a first jaw, in response to the start of the actuator. Suitable transfer means impart the movement of the cursor to the second jaw and the third jaw too.

The second and the third jaws translate along directions inclined with respect to the translation direction of the first jaw, preferably according to center angles of 120°. So, the transfer means are configured to take into account this aspect.

Particularly, the transfer means comprise two controlling levers, both rotatable on a respective rotation axis parallel to the aforesaid longitudinal axis, in response to the translatory movement of the cursor. Both levers are constrained to a corresponding jaw of the second and the third jaw to impart it a travel equivalent to the travel imparted by the cursor to the first jaw.

The term "jaw" is referred to any movable element intended to interact with the surface of the workpiece to be manipulated, regardless of its shape.

The clamp according to the present invention provides multiple advantages with respect to the known art.

The transfer levers rotate in a plane orthogonal to the longitudinal axis of the clamp body, that is a plane parallel to the sliding plane of the jaw; this arrangement allows for minimizing the bulk of the clamp along its longitudinal axis, or rather its vertical size. In other words, the clamp can have a particularly flat shape with respect to known clamps, leading to obvious positive effects on reduction and distribution of the overall weight of the clamp itself.

The use of transfer levers movable in a lying plane parallel to the sliding plane of the jaws, and that can rotate at the same time, allows to move the second and the third jaws in synchronism with the first jaw and to have three jaws with identical travels, de facto making the clamp self-centering. This prevents one of the jaws from interacting with the workpiece to be manipulated before the others, which could change the spatial position or cause breakages or damages.

Furthermore, a single cursor operates all jaws.

Preferably, the transfer levers are substantially coplanar, for example flat or nearly flat, so as not to affect the bulk of the clamp height, and they are interposed between the cursor and the jaws.

In a preferred embodiment of the invention, the second and the third jaws are each provided with a pin, or a similar connecting element, extending parallel to the longitudinal axis through a corresponding eyelet formed in the clamp body. Each of the levers comprises a guide, slidingly housing the pin, according to a coupling that can be assimilate to a cam and follower type. The guide of each transfer lever is arranged as an inner cam wherein the pin is driven arranged as a follower constrained to follow the path imparted by the guide by virtue of its shape.

In such an embodiment, the guide of each transfer lever extends preferably along an arc of a circumference whose center of curvature does not coincide with the rotation axis of the respective lever. According to this feature, when the transfer levers rotate, a corresponding translation of the respective pins along the moving direction of the connected jaws is provided. Actually, the pin moves with respect to the guide of the transfer lever and, at the same time, with respect to the clamp body.

More particularly, in a first position of the cursor all jaws are in the respective distal position and the pins of the second jaw and the third jaw are substantially at a first end of the respective guide of the corresponding transfer lever, that is the maximum distance from the longitudinal axis. In a second position of the cursor all jaws are in the respective proximal position and the pins of the second and third jaws are substantially at the second end of the respective guide of the corresponding transfer lever, that is the minimum distance from the longitudinal axis.

Preferably, the transfer levers insert at least partially in each other, together defining an eyelet extending along an arc of a circumference whose center of curvature is in the median plane of the first jaw, or else along the respective translation axis, at the opposite side with respect to the longitudinal axis. For example, the two transfer levers both comprise a perimetrical recess forming a half of the previously mentioned eyelet. The cursor comprises a dragging pin, or a similar coupling element, slidingly engaging the eyelet. The pin extends preferably parallel to the longitudinal axis from the cursor and inserts into the eyelet.

In more detail, in a first position of the cursor, each of the jaws are in the respective distal position and the levers are rotated in opposite directions with respect to the aforesaid median plane, each lever on the respective rotation axis. In a second position of the cursor each of the jaws are in the respective proximal position and the levers are rotated one towards each other and preferably are inserted at least partially one in another, towards the above mentioned median plane. Therefore, the eyelet defined by the levers extends and shortens as a consequence of the rotation of the levers themselves, respectively increasing or reducing the distance between each other.

Preferably another pin or a similar connecting element couples the cursor to the first jaw to make these components translationally integral.

Generally the clamp actuator can be any kind of actuator, as long as it is arranged for controlling the alternate movements of the cursor in the two ways of the respective translation direction. For example, the actuator is electric, or pneumatic or oleodynamic.

In the preferred embodiment the actuator is an electric motor and the drive means comprise a tow slide translatable in parallel with the cursor, at least one elastic element, and a thrust screw of the tow slide. The thrust screw is non-reversible, meaning that the respective thread prevents the unwanted rotation of the screw. The screw is oriented in parallel with the translation direction of the cursor. The tow slide is threaded too and it meshes the thrust screw, the latter operating the translation thereof in the two ways in response to the clockwise/anticlockwise rotation in its turn imparted by the shaft of the electric motor.

The cursor is supported by the tow slide and between these elements the elastic element, preferably a preloaded coil spring, is interposed. The preload is fixed by the manufacturer based on the use requirements of the clamp. The cursor and the tow slide can translate both integrally, till the preload of the elastic element does not change, and independently from one another, in response to a preload change of the elastic element produced by a resistance exerted against the translation movement of the jaws.

Actually, the slide-elastic element-cursor assembly acts as a compensator of the travel of the jaws that is able to adjust beforehand the force exerted by the jaws onto the pieces to be manipulated, even if the diameter thereof changes. This assembly also performs the function of releasing the electric motor from the task of pushing and keeping the jaws exactly in the respective end positions they can take, the distal and the proximal one. Preferably, the electric motor and the thrust screw are aligned one above the other to allow to minimize the side sizes of the clamp.

LIST OF THE FIGURES

Further characteristics and advantages of the present invention will be more evident from a review of the following specification of a preferred, but not exclusive, embodiment, shown for illustration purposes only and without limitation, with the aid of the attached drawings, in which.

DETAILED DESCRIPTION OF THE INVENTION

The enclosed FIGS. 1-6 show the preferred embodiment of the clamp 1 according to the present invention, comprising a body 2 housing the respective components.

The body 2 of the clamp 1 is made up of two portions, an upper portion 2A and a lower portion 2B. The upper portion 2A is substantially circular and extends around the longitudinal axis Z-Z and has a center recess 3, which is circular too.

Figure 1:
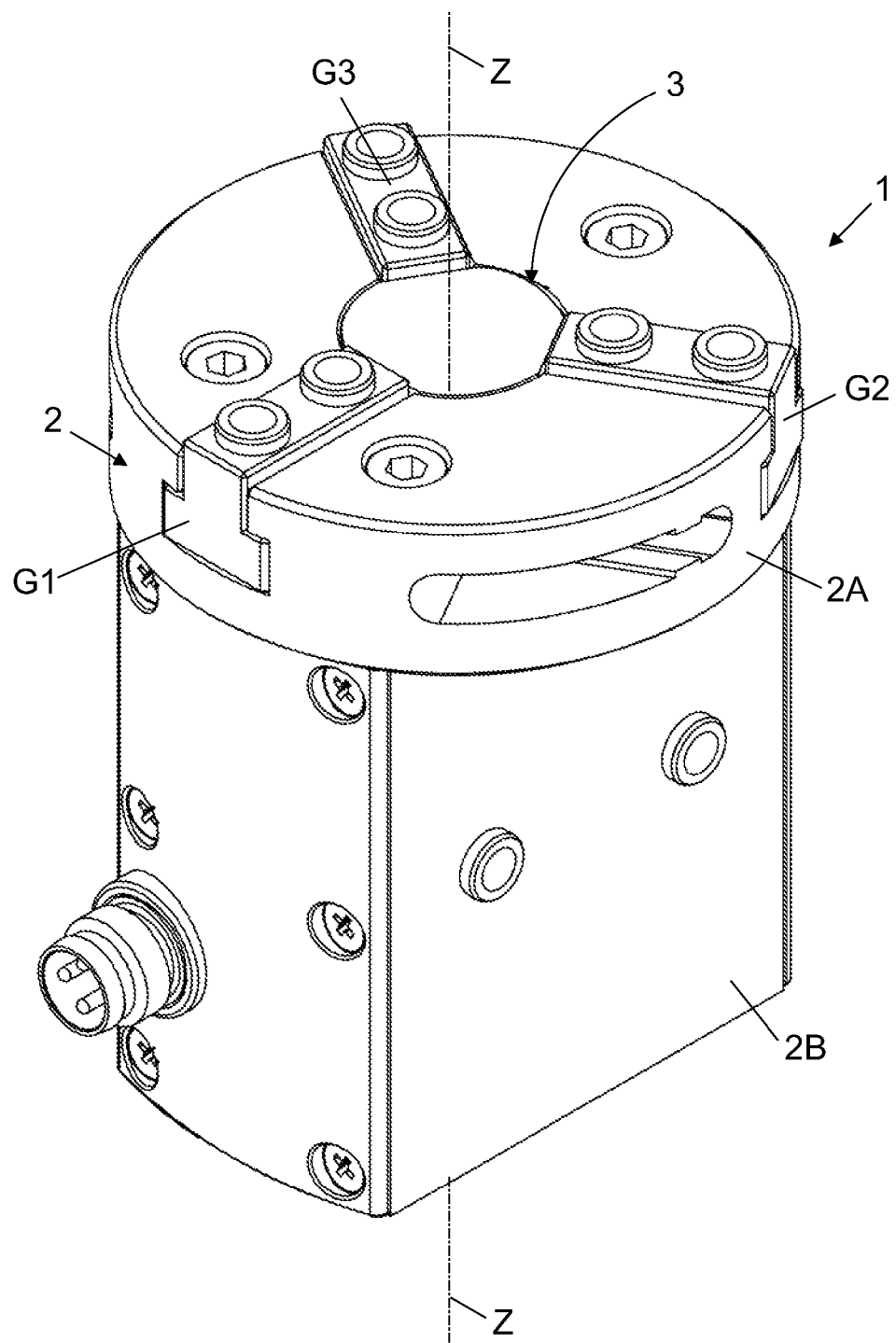
FIG. 1 is a perspective view of a clamp having three jaws according to the present invention.

The portion 2A of the body 2 houses the jaws G1, G2 and G3, that are slidable within respective seats, or tracks, 21-23 radially extending with respect to the axis Z-Z, along directions forming angles of 120° at the intersection of each other, and in the same lying plane. In FIG. 1 the jaws G1-G3 are fully retracted, i.e. they are in the position of minimum distance from the longitudinal axis Z-Z with respect to the travel each jaw can run, corresponding to the releasing position of the workpiece to be manipulated. The jaws G1-G3 can be translationally pushed in the respective seats 21-23 to be partially ejected beyond the perimeter of the portion 2A of the clamp body 2, taking the gripping position of the workpiece to be handled, which obviously is at least partially hollow, allowing the clamp 1 to be inserted therein.

In another embodiment, not shown in figures, the jaws G1-G3 can move towards the longitudinal axis Z-Z, beyond the position shown in FIG. 1, to close against a piece to be manipulate having a diameter small enough to be inserted in the jaws G1-G3 themselves.

By way of example only, the travel of each jaw G1, G2 or G3 is 3 mm, 6 mm or 9 mm, according to the size of the clamp 1.

Figure 2:
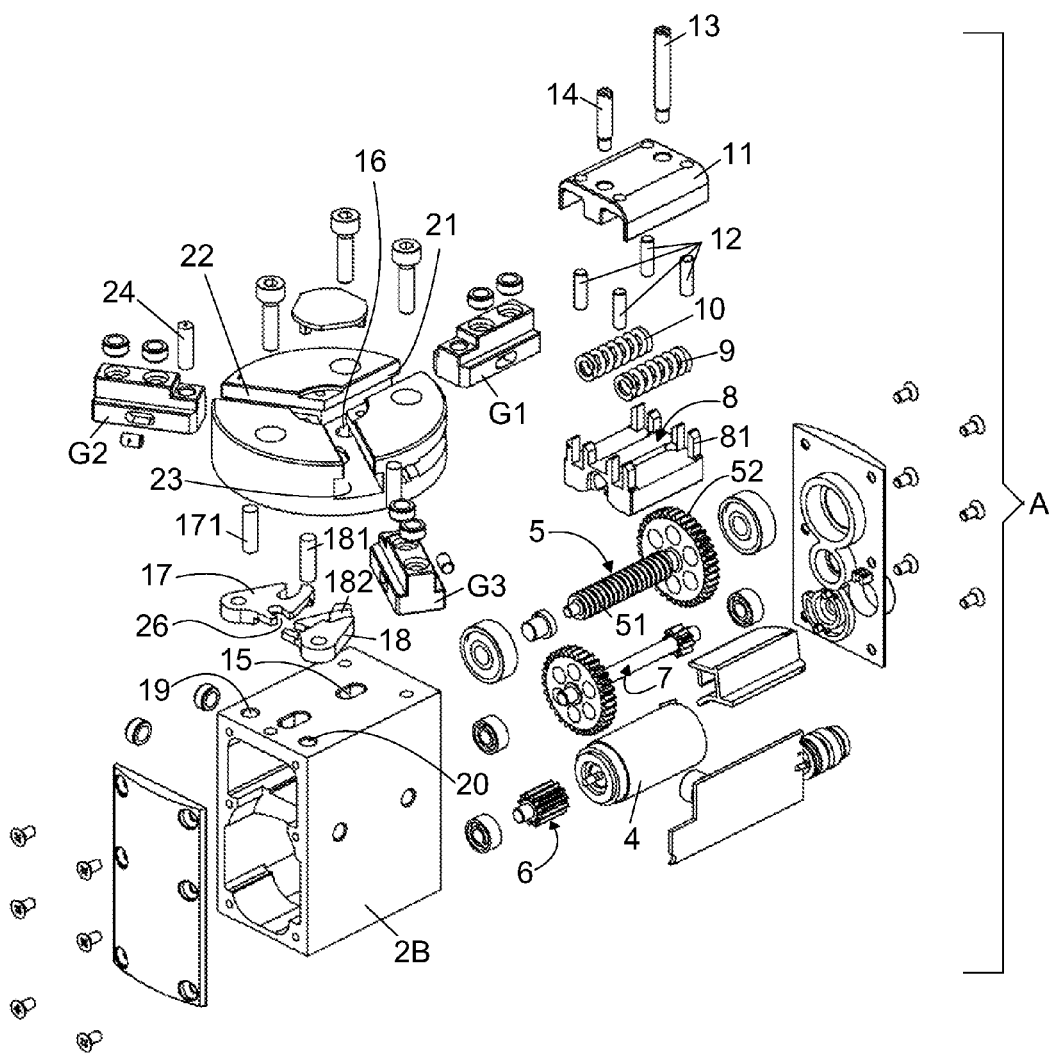
FIG. 2 is an exploded view of the clamp shown in FIG. 1.

The lower portion 2B of the body 2 houses most of the clamp components intended to activate the jaws G1-G3. FIG. 2 shows the elements in detail.

The portion 2B of the body 2 houses an actuator 4, for example an electric motor as illustrated in figures, aligned with the seat 21 of the first jaw G1. A thrust screw 5, comprising a threaded shank 51 having a non-reversible thread and a gear wheel 52 is kinematically connected to the shaft of the electric motor 4 by gears 6 and 7. In particular, the gear wheel 52 is cascade connected to the gear 7, the gear 6 and the shaft of the electric motor 4.

The threaded shank 51 of the thrust screw 5 engages a tow slide 8, threaded at its underside, to operate the movements thereof along the respective activating direction, parallel to the screw 5, and, accordingly, parallel to the activating direction of the first jaw G1.

In practice, the electric motor 4 controls the rotation of the corresponding shaft and the connected gear 6, inducing corresponding rotations of the screw 5 and translations of the tow slide 8.

The tow slide 8 supports a cursor 11, the latter being translatable too in the portion 2B of the body 2 of the clamp 1. Between the slide 8 and the cursor 11 two coil springs 9 and 10 are interposed, not only in a material way, but above all in an operational way. The coil spring 9 and 10 are compressively pre-loaded during the assembling step, directly by the manufacturer. If needed, during the following life of the clamp 1, the springs 9 and 10 can be replaced by springs having a different preload.

The assembly comprising the slide 8, the springs 9 and 10 the cursor 11, forms a device elastically compensating the travels of the jaws G1-G3, the device being equivalent to the one described in the Italian Patent Application BS2010A000074 of the 12 Apr. 2010.

The assembly comprises the afore said compensating device with the addiction of the actuator 4, the gears 6 and 7 and the thrust screw 5, the device A activating the clamp 1.

The pins 12 are integral with the cursor 11 and jut towards the tow slide 8 such that they act as plungers of the springs 9 and 10 when the cursor translates with respect to the tow slide 8. The pins 12 can be inserted between the shoulders 81 of the slide 8, that represent the extreme limit position of the springs 9 and 10 towards the respective side of the tow slide 8.

Substantially the tow slide 8, translated by the screw 5, always run a fixed travel, whereas the cursor 11 can also translate with respect to the tow slide 8 so as to run travels being variable within certain limits according to the resistance to movement the jaws G1-G3 meet in picking up a work piece. The springs 9 and 10 are compressed for absorb exceeding force that the jaws G1-G3 would otherwise apply on the piece to be manipulated.

The pin 13 and the dragging pin 14 extend vertically, that is parallel to the axis Z-Z, from the upper part of the cursor 11, with a different extension. The pin 13 directly engages the first jaw G1, passing through two aligned openings 15 and 16 obtained respectively through the lower portion 2B and the upper portion 2A of the body 2. The resulting connection makes the cursor 11 and the first jaw G1 translationally integral with respect to the body 2 of the clamp 1.

The cinematic chain formed by the elements 6, 7, 8-11, 13 and 14 accomplishes the motion transmission from the electric motor to the jaws G1-G3.

The dragging pin 14, pushed by the cursor 11, actually drives the movement of the remaining jaws G2 and G3, not directly but by interposing proper transfer means that will be described hereinafter.

The transfer means comprise two horizontally actuated levers 17 and 18 and respective pins 21 and 22 connecting them to the jaw G2 and the jaw G3, respectively. The levers 17 and 18 are intended to rotate around pivots that are referred to with the numerals 171 and 181. The pivots 171 and 181 are parallel to the longitudinal axis Z-Z and insert in corresponding seats 19 and 20 obtained on the upper surface of the portion 2B of the body 2.

As it could be appreciated in FIG. 2, the horizontal transfer levers 17 and 18 are shaped so as to partially insert one in another when the angle between the levers themselves decreases as a consequence of their rotation. At the bottom of the upper portion 2A of the body 2 a special recess is provided for housing the levers 17 and 18.

The transfer levers 17 and 18 are respectively provided with guides 172 and 182 shaped as an inner cam, slidingly housing the pins 24 and 25 constrained to the jaws G2 and G3. The levers 17 and 18 together define an eyelet 26 wherein the pin 14 from the cursor 11 is inserted.

Figure 3:
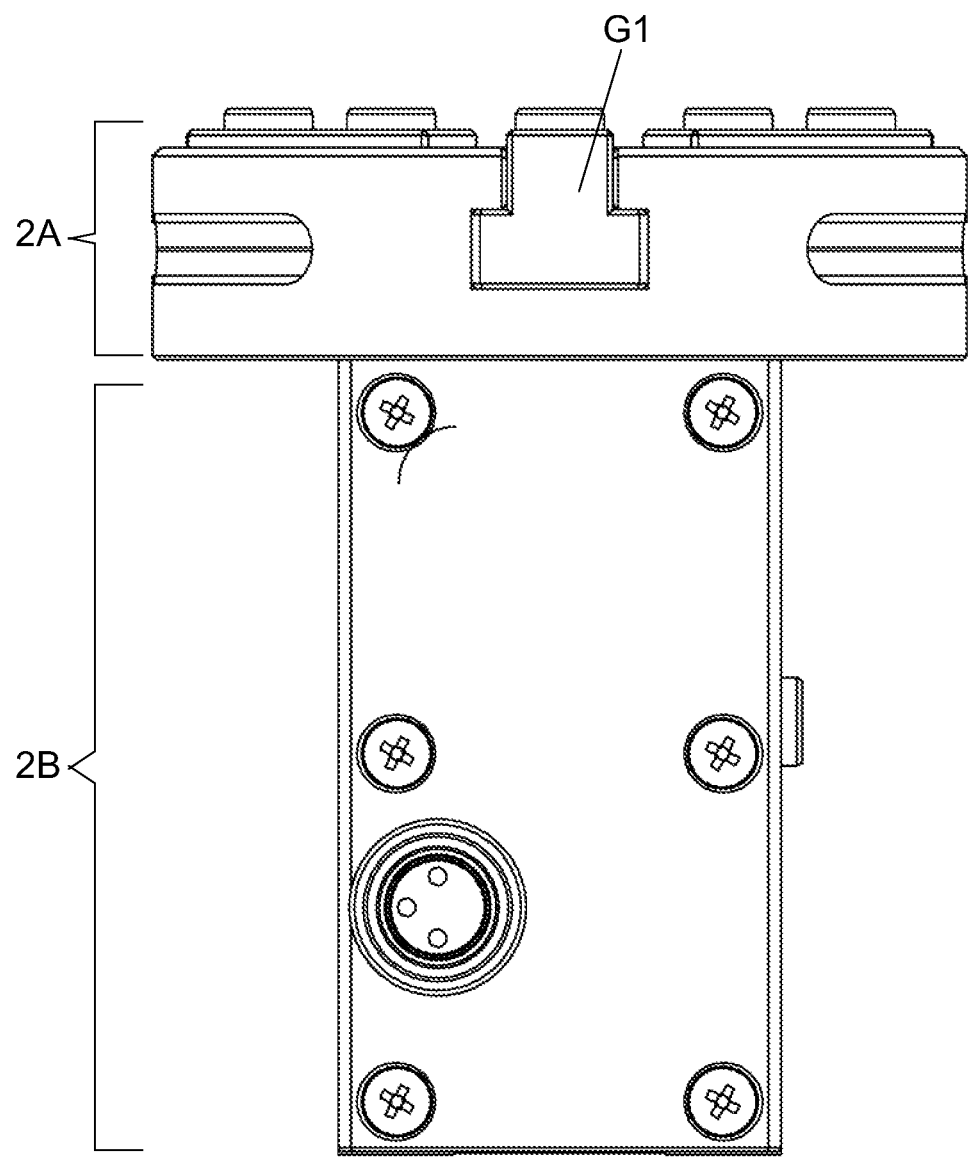
FIG. 3 is a side elevation view of the clamp shown in FIG. 1.

FIG. 3 shows the clamp 1 in elevation view; as it could be appreciated, the arrangement of the drive elements and the actuator in the lower portion 2B of the body 2, allows to limit the side sizes of the portion 2B itself to a dimension far smaller than the sizes of the upper portion 2A.

Figure 4:
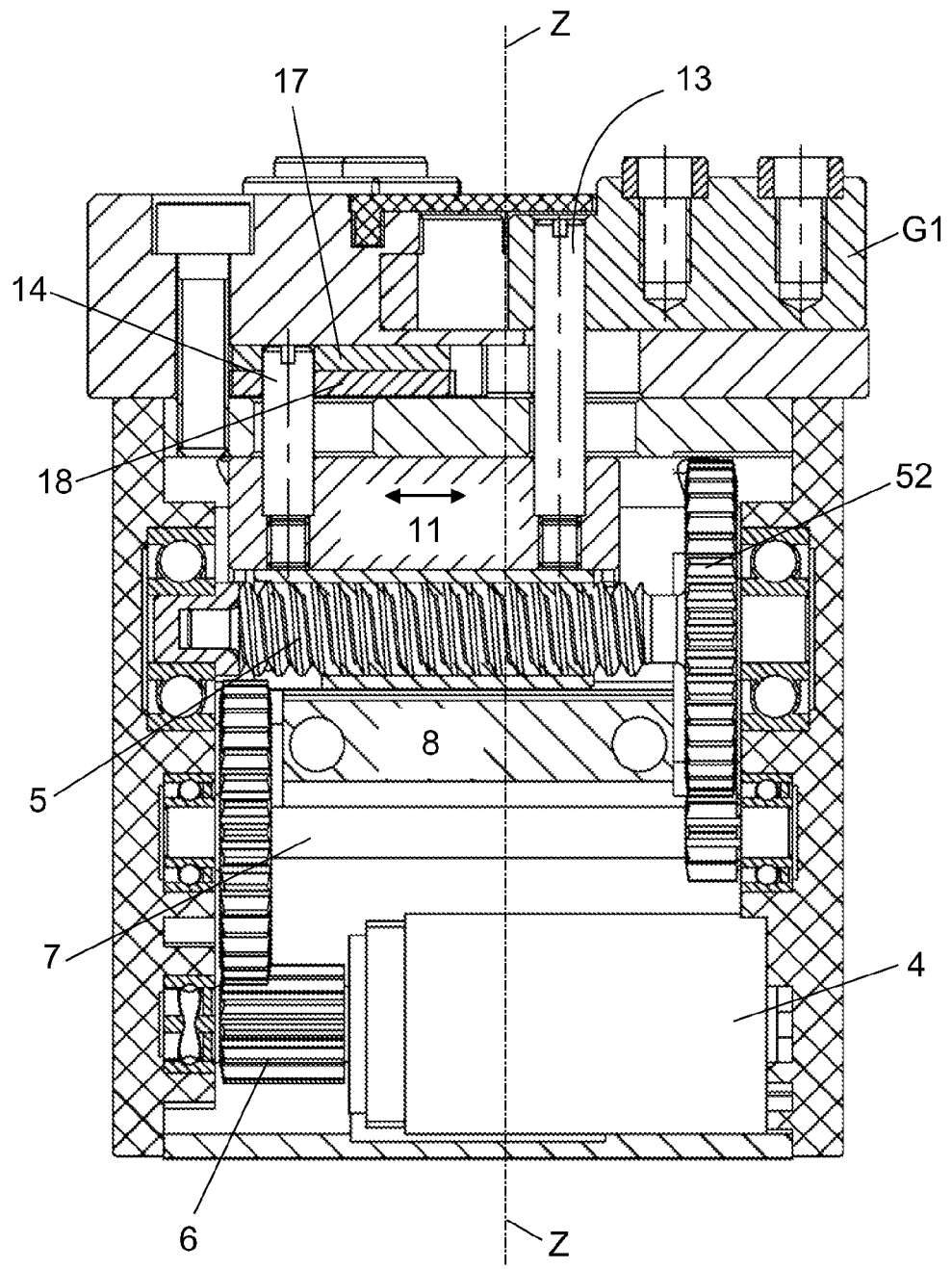
FIG. 4 is an first vertical section view of the clamp shown in FIG. 1.
Figure 5:
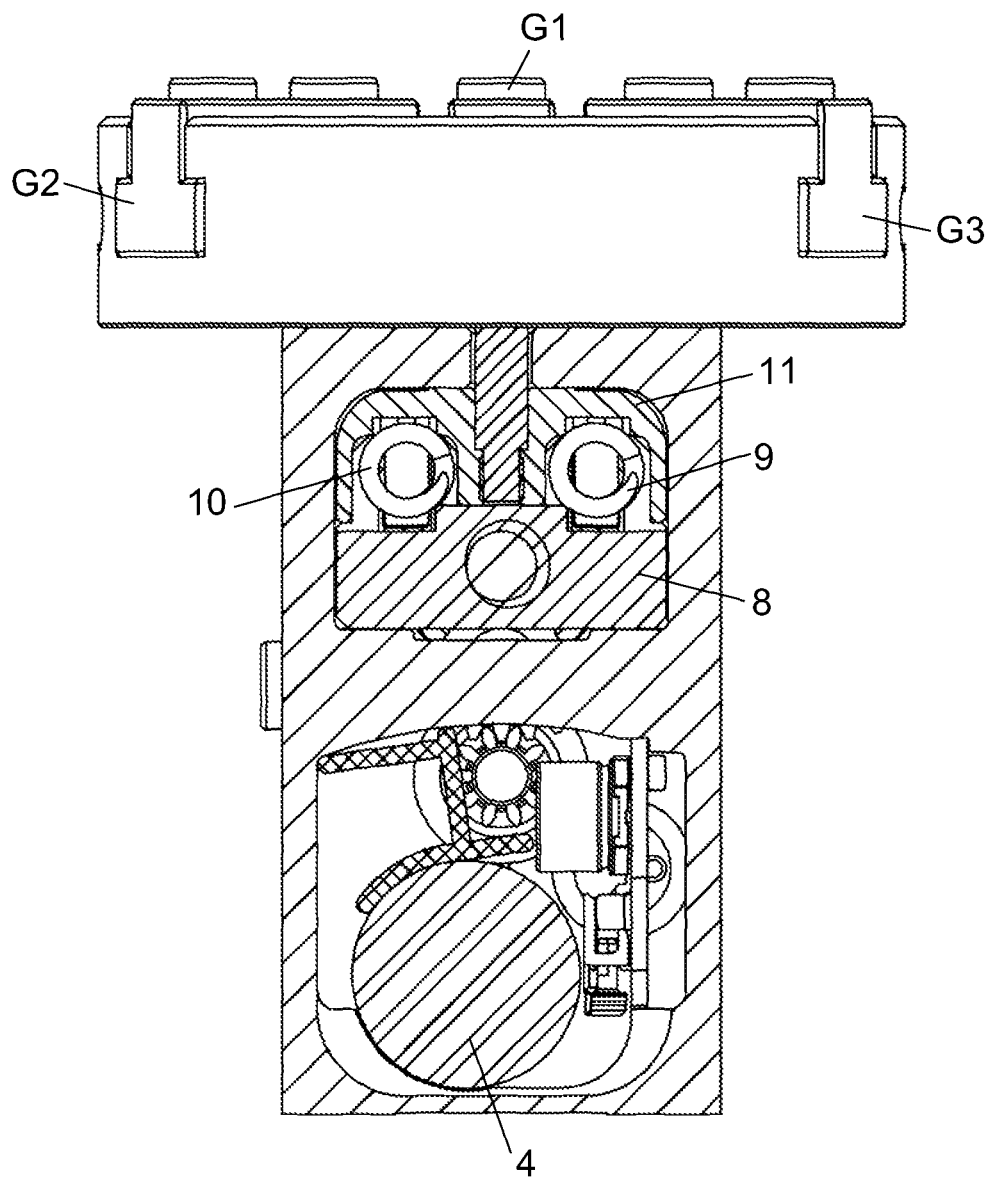
FIG. 5 is a second vertical section view of the clamp shown in FIG. 1.

The operation of the clamp 1 will be now described, referring to FIGS. 4 and 5 which respectively show two orthogonal longitudinal section, the first one taken along the median plane of the seat 21 of the jaw G1, and a cross section taken along a plane parallel to the lying plane of the seats 21-23 flush with the transfer levers 17 and 18.

In FIG. 4, the jaw G1 is shown fully retracted in the respective seat 21, that is the position proximal to the longitudinal axis Z-Z. The jaws G2-G3 are also in the proximal position, previously referred to as no-working position or releasing position of the piece.

The rotation of the screw 5 is controlled by activating the motor 4 and giving the gears 6, 7 and 52 a rotation. This causes the tow slide 8 and the cursor 11 to be translated (to the right in FIG. 4) in the direction leading the jaw G1 to project beyond the perimeter of the portion 2A of the body 2, for example by about 3 mm. The transfer levers 17 and 18 push the jaws G2 and G3 into the respective seats 22 and 23 with the same travels of the jaw G1.

The assembly comprising the springs 9 and 10, the tow slide 8 and the cursor 11, moves rigidly as a whole provided that the jaws G1-G3 do not meet resistance. If the jaws G1-G3 meet resistance, for example coming in abutment against the inner surface of the piece to be manipulated, the springs 9 and 10 compress to absorb the thrust corresponding to the remaining travel of the jaws G1-G3. Under this circumstances, the cursor 11 stops moving integrally with the tow slide 8 and translates with respect to the latter; for example, the slide 8 completes its travel and the cursor 11 stays still because of the jaws G1-G3 are in abutment against the piece to be manipulated.

FIG. 5 shows a section orthogonal to the springs 9 and 10.

Figure 6:
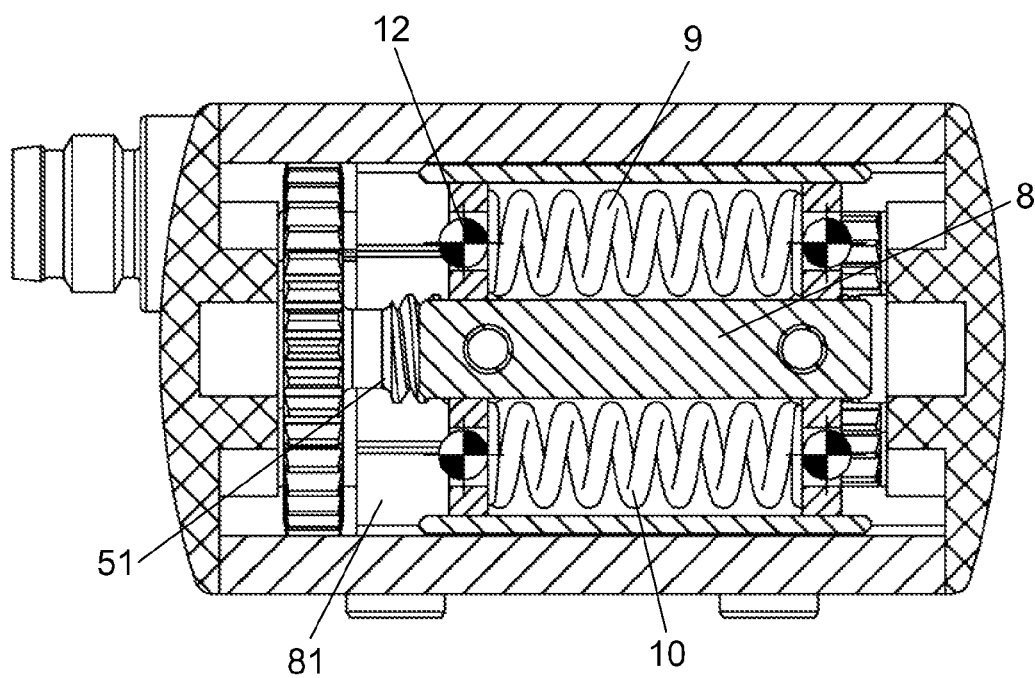
FIG. 6 is a first cross section view of the clamp shown in FIG. 1.

FIG. 6 shows a cross section of the clamp 1 wherein the springs 9 and 10 appear compressed no more than the initial preload, that is to say in the releasing position of the jaws G1-G3.

Figure 7:
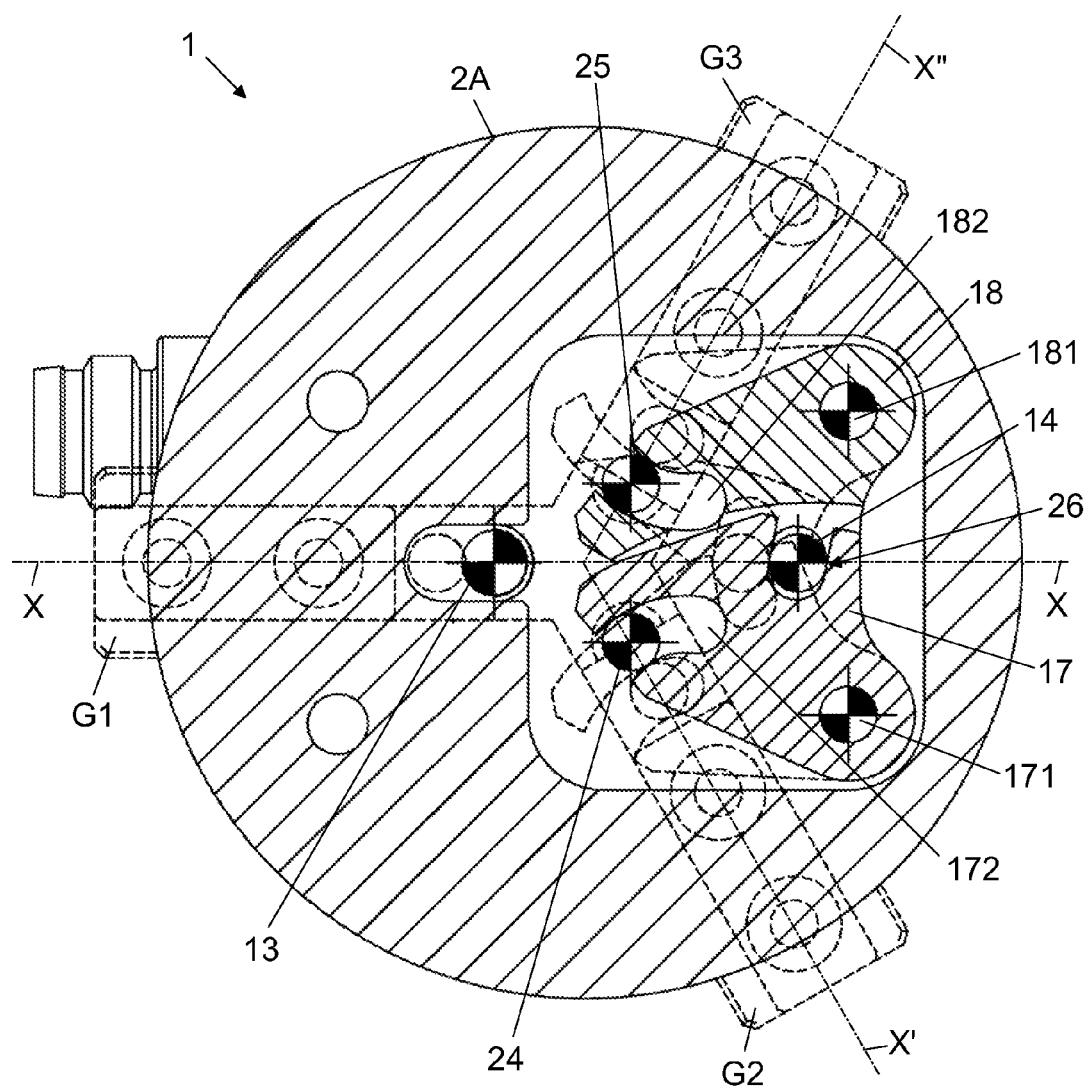
FIG. 7 is a second cross section view of the clamp shown in FIG. 1.

Referring in particular to FIG. 7, there is shown a top view of the transfer lever 17 and 18, partially inserted in one another, and ready to be rotated about the respective pivots 171, 181 in the sheet plane. The pins 13 and 14 alternately translate in the two ways of the axis X-X integrally with the cursor 11, according to the direction of rotation of the shaft of the motor 4. The pins 24, 25 are at a first end of the respective guide 172, 182.

The dotted lines show the distal position of the jaws G1-G3, i.e. the maximum radial position projecting from the perimeter of the portion 2A, to grip the piece to be manipulated. The pins 24, 25 are at the second end of the respective guide 172, 182.

To drive the jaws G1-G3 from the releasing position to the gripping position, the cursor moves to the left in FIG. 6. The pin 13 drives the jaw G1 directly; the pin 14 applies a thrust onto the walls of the eyelet 26 causing the levers 17 and 18 to rotate simultaneously in opposite directions. Under these circumstances, referring to FIG. 6, the lever 18 rotates clockwise and the lever 17 rotates counterclockwise; the eyelet 26, extending along an arc of circumference transverse to axis X-X, tends to open that is to extend. In particular, as it could be appreciated, the center of curvature of the eyelet 26 is on the median plane of the seat 21 of the jaw G1, or rather the vertical plane containing the axis X-X.

The guides 172 and 182 slide with respect to the pins 24 and 25 that are, at the same time, translationally pushed along the directions X' and X", actually causing the jaws G2 and G3 to translate in the respective seats 22 and 23. The directions X-X, X' and X" form angles of 120°.

Obviously a translation of the cursor 11 in the opposite way returns the jaws G1 and G3 into the initial releasing position.

This dynamics is possible due to the shape of the guides 172 and 182, each extending along an arc of circumference having its rotation center offset with respect to the pivots 171 and 181.

The described configuration allows the synchronous movement of all jaws G1-G3 with identical travels, resulting in the self-centering effect with respect to the longitudinal axis Z-Z as previously described.

Preferably the jaws G1-G3 transfer from the releasing position to the gripping position, and vice versa, in less than a tenth of a second.

According to the sizing of electric motor 4, or the pneumatic/oleo pneumatic actuator used as an alternative, each jaw G1-G3 can preferably apply a force of 100 N to 400 N to the piece to be manipulated.

The invention claimed is:

1. Clamp (1) comprising: a body (2) provided with a longitudinal axis (Z-Z) and three coplanar seats (21-23) for housing corresponding first, second and third jaws (G1-G3), wherein the jaws (G1-G3) are each alternately translatable into the respective seat (21-23) in two ways (X-X, X', X") of a direction orthogonal to the longitudinal axis (Z-Z), between a proximal position and a distal position with respect to the longitudinal axis (Z-Z) itself, and a device (A) for activating the jaws comprising an actuator (4) and a drive mechanism (5-14) adapted to drive a motion of the actuator (4) to the jaws (G1-G3), wherein the drive mechanism (5-14) comprises a cursor (11) translatable in said body (2) integrally with the first jaw (G1), in response to the actuator (4) starting, and a transmission configured to impart movement of the cursor (11) to the second jaw (G2) and the third jaw (G3), wherein the transmission comprises two controlling levers (17, 18), both rotatable on a respective rotation axis parallel to the longitudinal axis (Z-Z), in response to the translatory movement of the cursor (11), the second jaw (G2) and the third jaw (G3) are both provided with a pin (24, 25) extending in parallel with the longitudinal axis (Z-Z) through the body (2A) of the clamp and wherein both levers (17, 18) comprise a guide (172, 182) in which the pin (24, 25) is slidingly accommodated and both levers (17, 18) are also constrained to a corresponding jaw of said second (G2) and said third (G3) jaws to impart a travel equivalent to the travel imparted by the cursor (11) to the first jaw (G1).

2. Clamp (1) having three jaws according to claim 1, wherein said levers (17, 18) are substantially coplanar and rotate in a lying plane parallel to a lying plane of the seats (21-23) of the jaws (G1, G3).

3. Clamp (1) having three jaws according to claim 1, wherein said levers (17, 18) are substantially flat and are interposed between the cursor (11) and the jaws (G1, G3).

4. Clamp (1) having three jaws according to claim 1, wherein said guide (172, 182) extends along an arc of a circumference with a center of curvature that does not coincide with a rotation axis of the respective lever (17, 18).

5. Clamp (1) having three jaws according to claim 4, wherein in a first position of the cursor (11) each of the jaws (G1-G3) are in the respective distal position and the pins (24, 25) of the second jaw (G2) and the third jaw (G3) are substantially at a first end of the respective guide (172, 182) of the corresponding lever (17, 18) and in a second position of the cursor (11) each of the jaws (G1-G3) are in the respective proximal position and the pins (24, 25) of the second jaw (G2) and the third jaw (G3) are substantially at the second end of the respective guide (172, 182) of the corresponding lever (17, 18).

6. Clamp (1) having three jaws according to claim 1, wherein said actuator (4) is electric or pneumatic or oleodynamic.

7. Clamp (1) having three jaws according to claim 6, wherein said actuator (4) is an electric motor and said drive mechanism comprises a tow slide (8) translatable in parallel with the cursor (11), at least one elastic element (9, 10) and a thrust screw (5) of the tow slide (8), wherein: the thrust screw (5) is oriented in parallel with the translation direction of the cursor (11) and the respective thread is non-reversible, and the tow slide (8) is also threaded and meshes with the thrust screw (5), the latter operating the translation thereof in two ways in response to clockwise/counterclockwise rotation imparted by a shaft of the electric motor (4), the cursor (11) is supported by the tow slide (8) and at least one elastic preloaded element (9, 10) is interposed therebetween so that the cursor (11) and the tow slide (8) can translate both integrally, till the preload of the elastic element (9, 10) does not change, and independently one from another, in response to a preload change of the elastic element (9, 10) produced by a resistance exerted against the translation movement of the jaws (G1-G3).

8. Clamp (1) comprising: a body (2) provided with a longitudinal axis (Z-Z) and three coplanar seats (21-23) for housing corresponding first, second and third jaws (G1-G3), wherein the jaws (G1-G3) are each alternately translatable into the respective seat (21-23) in two ways (X-X, X', X") of a direction orthogonal to the longitudinal axis (Z-Z), between a proximal position and a distal position with respect to the longitudinal axis (Z-Z) itself, and a device (A) for activating the jaws comprising an actuator (4) and a drive mechanism (5-14) adapted to drive a motion of the actuator (4) to the jaws (G1-G3), wherein the drive mechanism (5-14) comprises a cursor (11) translatable in said body (2) integrally with the first jaw (G1), in response to the actuator (4) starting, and a transmission configured to impart movement of the cursor (11) to the second jaw (G2) and the third jaw (G3), wherein the transmission comprises two controlling levers (17, 18), both rotatable on a respective rotation axis parallel to the longitudinal axis (Z-Z), in response to the translatory movement of the cursor (11), and wherein both levers (17, 18) are constrained to a corresponding iaw of said second (G2) and said third (G3) jaws to impart a travel equivalent to the travel imparted by the cursor (11) to the first jaw (G1), wherein said levers (17, 18) are inserted at least partially one in another together defining an eyelet (26) extending along an arc of a circumference with a center of curvature that is in the median plane of the first jaw (G1), at the opposite side with respect to the longitudinal axis (Z-Z), and wherein the cursor (11) comprises a dragging pin (14) slidingly engaging the eyelet (26).

9. Clamp (1) having three jaws according to claim 8, wherein in a first position of the cursor (11) each of the jaws (G1-G3) are in the respective distal position and the levers (17, 18) are rotated in opposite directions with respect to said median plane, each on the respective rotation axis, and wherein in a second position of the cursor (11) each of the jaws (G1-G3) are in the respective proximal position and the levers (17, 18) are rotated one towards each other and both towards said median plane.

10. Clamp (1) comprising: a body (2) provided with a longitudinal axis (Z-Z) and three coplanar seats (21-23) for housing corresponding first, second and third jaws (G1-G3), wherein the jaws (G1-G3) are each alternately translatable into the respective seat (21-23) in two ways (X-X, X', X") of a direction orthogonal to the longitudinal axis (Z-Z), between a proximal position and a distal position with respect to the longitudinal axis (Z-Z) itself, and a device (A) for activating the jaws comprising an actuator (4) and a drive mechanism (5-14) adapted to drive a motion of the actuator (4) to the jaws (G1-G3), wherein the drive mechanism (5-14) comprises a cursor (11) translatable in said body (2) integrally with the first jaw (G1), in response to the actuator (4) starting, and a transmission configured to impart movement of the cursor (11) to the second jaw (G2) and the third jaw (G3), wherein the transmission comprises two controlling levers (17, 18), both rotatable on a respective rotation axis parallel to the longitudinal axis (Z-Z), in response to the translatory movement of the cursor (11), and wherein both levers (17, 18) are constrained to a corresponding jaw of said second (G2) and said third (G3) jaws to impart a travel equivalent to the travel imparted by the cursor (11) to the first jaw (G1) , further comprising a pin (13) for connecting the cursor (11) to the first jaw (G1) to render these elements translationally integral.

* * * * *